United States Patent
Stevens

(10) Patent No.: US 7,729,007 B2
(45) Date of Patent: Jun. 1, 2010

(54) ABSTRACT PARAMETER PRINT MODE MIMIC GENERATION

(75) Inventor: Michael Thomas Stevens, Aloha, OR (US)

(73) Assignee: Xerox Corporation, Norwalk, CT (US)

(*) Notice: Subject to any disclaimer, the term of this patent is extended or adjusted under 35 U.S.C. 154(b) by 1195 days.

(21) Appl. No.: 11/313,660

(22) Filed: Dec. 22, 2005

(65) Prior Publication Data
US 2007/0146731 A1 Jun. 28, 2007

(51) Int. Cl.
G06F 15/00 (2006.01)
G06K 1/00 (2006.01)
H04N 1/60 (2006.01)
G06F 3/12 (2006.01)

(52) U.S. Cl. .................... 358/1.9; 358/1.13

(58) Field of Classification Search ............. 358/1.9, 358/1.13, 1.1, 1.15, 1.14
See application file for complete search history.

(56) References Cited

U.S. PATENT DOCUMENTS

| | | | | |
|---|---|---|---|---|
| 2004/0120596 | A1* | 6/2004 | Ishii et al. | 382/254 |
| 2005/0149864 | A1* | 7/2005 | Matsuzaki et al. | 715/528 |
| 2006/0061787 | A1* | 3/2006 | Kinjo | 358/1.9 |

* cited by examiner

*Primary Examiner*—Douglas Q Tran
(74) *Attorney, Agent, or Firm*—Ronald E. Prass, Jr.; Prass LLP

(57) ABSTRACT

A method, system, and computer program for generating a visual representation provides the capability to illustrate the various combinations of settings quickly and efficiently. A method for generating a visual representation comprises providing a plurality of predefined visual representations, accepting a plurality of values of a plurality of parameters, and generating a visual representation representing effects of the parameters based on the predefined visual representations and on the values of the parameters.

17 Claims, 5 Drawing Sheets

ABSTRACT PARAMETER PRINT MODE MIMIC GENERATION

TECHNICAL FIELD

The present technology relates to a method, system, and computer program for generating a generating a visual representation representing the effect of image processing settings on a processed image.

BACKGROUND OF THE TECHNOLOGY

Color printers utilizing various technologies have become quite common. Many such color printers connect to, and are controlled by computer systems, and provide the capability to print color documents from the computer system. Software known as a driver controls the printing of such documents by sending commands and data to a printer. Typically, a separate driver is provided for each type of printer connected to a computer system, although some drivers have the capability of controlling more than one type of printer.

Many printer drivers provide the capability for a user to set a number of parameters that control aspects of the printing process and features of the printed document. For example, parameters such as print quality and color balance are relatively common. So that the user can visualize the effect of various settings, many printer drivers attempt to display an impressionistic mimic of the user's print choices. The goal is to imply to the user the relative differences between various selections. Typically, each driver for each type of printer is hardcoded with mimics for each combination of settings that are specific to that type of printer. This requires each printer driver to be modified for each type of printer and also requires relatively large amounts of memory to store the predefined mimics.

A need arises for a technique by which mimics that illustrate the various combinations of printer settings may be generated quickly and efficiently, so that mimics for each combination of settings do not have to be included in each printer driver.

SUMMARY OF THE TECHNOLOGY

A method, system, and computer program for generating a visual representation (mimic) provides the capability to illustrate the various combinations of printer settings may be generated quickly and efficiently, so that mimics for each combination of settings do not have to be included in each printer driver. Each printer will be able to tune their mimics using a small set of abstract parameters. This will allow individual printers to customize their mimics such that they properly simulate the print modes in the printer without the need for generating new mimics for each printer.

N-body interpolation may be used to generate each mimic on the fly. There is a base line mimic and a number of abstract parameter mimics. Each abstract mimic represents the epitome of that abstract parameter. When a print mode is chosen by the printer development team, that print mode is then quantified using the abstract parameters. Those parameters are then used as the weights for the mimic interpolation.

A method for generating a visual representation comprises providing a plurality of predefined visual representations, accepting a plurality of values of a plurality of parameters, and generating the visual representation by interpolating among the predefined visual representations based on the values of the parameters to generate the visual representation representing effects of the parameters.

The plurality of predefined visual representations may comprise, for at least a subset of the plurality of parameters, a predefined visual representation corresponding to all of the subset of the parameters having their maximum values, and, for each of the parameters in the subset of parameters, a predefined visual representation corresponding to the parameter having its maximum value and the other parameters of the subset of parameters having their minimum values. The interpolating may be performed by performing N-body interpolation among the predefined visual representations, wherein N is equal to the number of predefined visual representations.

The method may further comprise modifying the generated visual representation based on at least one additional parameter, to represent the effect of the at least one additional parameter. The generated visual representation may be modified algorithmically based on at least one additional parameter. The plurality of parameters may comprise at least one of: a parameter representing a size of a gamut of a colorspace, a parameter representing a halftone graininess of an image, a parameter representing a quality of a photographic image, a parameter representing a quality of graphics of an image, a parameter representing an amount of color correction of an image, a parameter representing an amount of lightness correction of an image, a parameter representing an amount of hue correction of an image, a parameter representing an amount of lightness adjustment of an image, a parameter representing an amount of contrast adjustment of an image, a parameter representing an amount of saturation adjustment of an image, a parameter representing an amount of cyan cast adjustment of an image, a parameter representing an amount of magenta cast adjustment of an image, and a parameter representing an amount of yellow cast adjustment of an image. The method may be performed for a photocopier, a xerographic photocopier, a scanner, a printer, a xerographic printer, a fax machine, a xerographic fax machine, a multi-function device, or a xerographic multi-function device.

BRIEF DESCRIPTION OF THE DRAWINGS

Objects and advantages of the technology described in the present disclosure will be more clearly understood when considered in conjunction with the accompanying drawings, in which.

DETAILED DESCRIPTION

A mimic is an impressionistic visual representation of the effect of image processing settings on a processed image. A mimic is not intended to provide a realistic representation of images in an actual document, but rather is intended to indicate to the user the relative differences among various image processing selections. For example, if the user selects image processing settings to lighten a document, the mimic will be correspondingly lightened to indicate this to the user. Typically, image processing settings are applied to a printer and set in a printer driver. However, the present technology is applicable to any image processing in which settings may be selected. Likewise, any image processing settings may be indicated by the mimic.

A method, system, and computer program for generating mimics provides the capability to illustrate the various combinations of printer settings may be generated quickly and efficiently, so that mimics for each combination of settings do not have to be included in each printer driver. Each printer will be able to tune their mimics using a small set of abstract parameters. This will allow individual printers to customize their mimics such that they properly simulate the print modes in the printer without the need for generating new mimics for each printer.

N-body interpolation may be used to generate each mimic on the fly. There are a base line mimic and a number of abstract parameter mimics. Each abstract mimic represents the epitome of that abstract parameter. When a print mode is chosen by the printer development team, that print mode is then quantified using the abstract parameters. Those parameters are then used as the weights for the mimic interpolation.

Figure 1:
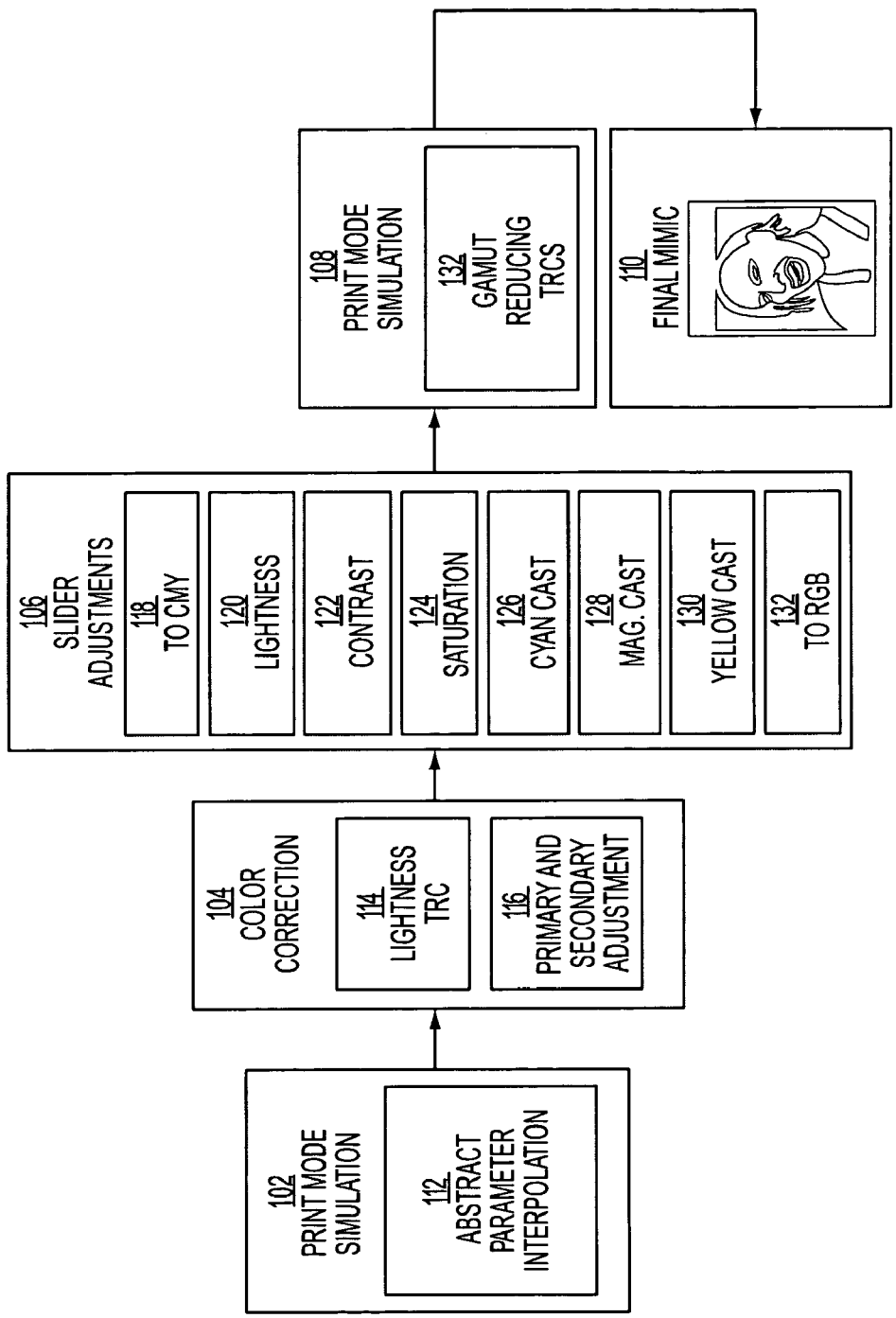
FIG. 1 is an exemplary flow diagram of a process of visual representation (mimic) generation.

An example of a process 100 of mimic generation is shown in FIG. 1. Typically, there are three input categories that affect this mimic: the print mode, the color correction, and color slider settings. In the example shown in FIG. 1, print mode simulation processing 102 is performed, followed by color correction processing 104, slider adjustment processing 106, additional print mode simulation processing 108, and final mimic output 110.

Print mode simulation processing 102 includes abstract parameters interpolation 112. This step uses a number of predefined mimics, then performs N-body interpolation to generate a mimic that is representative of the values of the abstract parameters that represent the particular printer.

An example of abstract parameters that may be utilized is shown in Table A. It is to be noted that these parameters are merely an example, and that the present technology is applicable to any and all parameters that may be utilized.

In this example, there is a further constraint on the Graininess, EnhancedImages, and EnhancedGraphics parameter in that the sum of those three parameters has to be less than or equal to 256.

Parameters such as those shown in Table A may be used to quantify the print mode. The print modes for each particular type of printer are defined in terms of these abstract parameters. These parameters become the weights for N-body interpolation. This allows the driver mimics to be customized without generating new art for each product.

Figure 2:
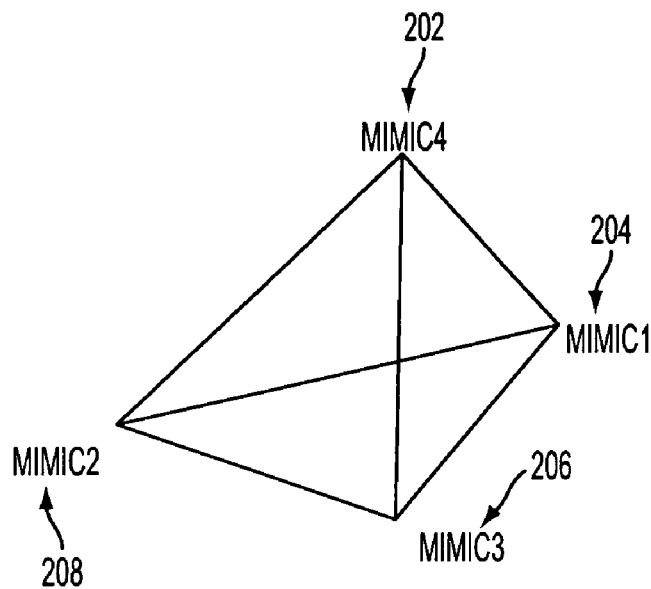
FIG. 2 is an exemplary illustration of a three-dimensional representation of relationships among predefined mimics.

The drivers will use a relatively small number of predefined mimics. One predefined mimic, termed the baseline mimic, represents the mimic when all the parameters are zero. In addition, one predefined mimic is provided for each of the abstract parameters. Each of these mimics represents the situation in which the abstract parameter is at its maximum value and all other parameters are zero. The predefined mimics may be thought of as representing a representation in three-dimensional space, with each predefined mimic forming a vertex of the representation. Referring to FIG. 2, an example of a three-dimensional representation of the relationships among the predefined mimics is shown. In this example, there are are three parameters represented, thus four mimics are used in 3-space, and each mimic 202, 204, 206, and 208, forms a vertex of the representation. The representation forms a tetrahedron that is the convex hull of the four mimic vertices. Here, Mimic4 202 is the base line mimic. N-body interpolation expands well into extra dimensions, so it extra abstract parameters may be easily be added. For example, if a gloss parameter is added, there would be five mimics, and the process would use 4 dimensional N-body interpolation.

Figure 3:
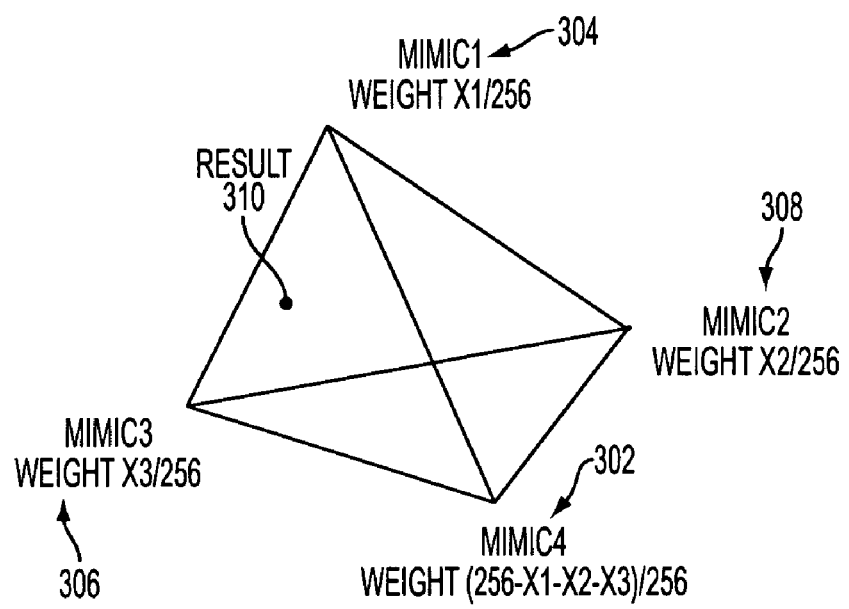
FIG. 3 is an exemplary illustration of generation of weighted mimics from predefined mimics using values of weights for each of the abstract parameters.

Referring to FIG. 3, in the example shown, the values of weights for each of the abstract parameters have been used to generate weighted mimics 302, 304, 306, and 308 from the predefined mimics. The values are relative weights of the form x/256. N-body interpolation is applied to the weighted mimics 302, 304, 306, and 308 to create a single resulting mimic 310 that represents a selected print mode of a particular printer.

TABLE A

| Parameter Name | Type | Range | Description |
| --- | --- | --- | --- |
| Gamut | double | $0 \leq x \leq 1$ | This parameter describes the print mode colorspace gamut size. A value of 1 represents the largest possible gamut. A value of 0 results in a gamut of zero volume. It is unlikely that a product will use a value less than 0.7 for any of its modes. |
| Graininess | integer | $0 \leq x \leq 256$ | This parameter represents halftone graininess. A value of 256 is very grainy. A value of 0 results in a mimic with no visible graininess. |
| EnhancedImages | integer | $0 \leq x \leq 256$ | This parameter is used to suggest that this print mode produces outstanding photographic images. A value of 0 will generate a mimic that gives the impression of average images. A value of 256 will generate a mimic that gives the impression of exceptional images. |
| EnhancedGraphics | integer | $0 \leq x \leq 256$ | This parameter is used to suggest that this print mode produces outstanding graphics. A value of 0 will generate a mimic that gives the impression of average graphics. A value of 256 will generate a mimic that gives the impression of exceptional graphics. |

While many parameters may be advantageously simulated using N-body interpolation, some parameters are special. For example, the gamut parameter may be simulated algorithmically. Parameters that are simulated algorithmically are processed in the last step of the mimic generation process, step 108. For example, in step 108, the gamut parameter may be processed using an algorithm such as $J(x, \gamma)=(2\gamma-\gamma^2)x+(\gamma^2-\gamma)x^2$, where x is the channel value such that $0 \leq x \leq 1$, and $\gamma$ is the gamut parameter. The algorithm may be implemented as a TRC, here named J, and applied to each channel in a CMY color space. Note that J becomes an identity function when $\gamma$ is equal to 1.

Returning to FIG. 1, in step 104 of process 100, color correction adjustment is performed. The color correction adjustment is intended to give the user an impression of the relative differences between color adjustments. With that said, the color correction adjustment is a simple (fast) adjustment. It occurs in two phases. The first phase, step 114, is a lightness adjustment. This is accomplished via a TRC, here named L. Let $L(x, \lambda)=(1+\lambda)x-\lambda x^2$, where x is the channel value such that $0 \leq x \leq 1$, and $\lambda$ is the lightness parameter. In this example, $\lambda$ has a valid range such that $-1 \leq \lambda \leq 1$.

Figure 4:
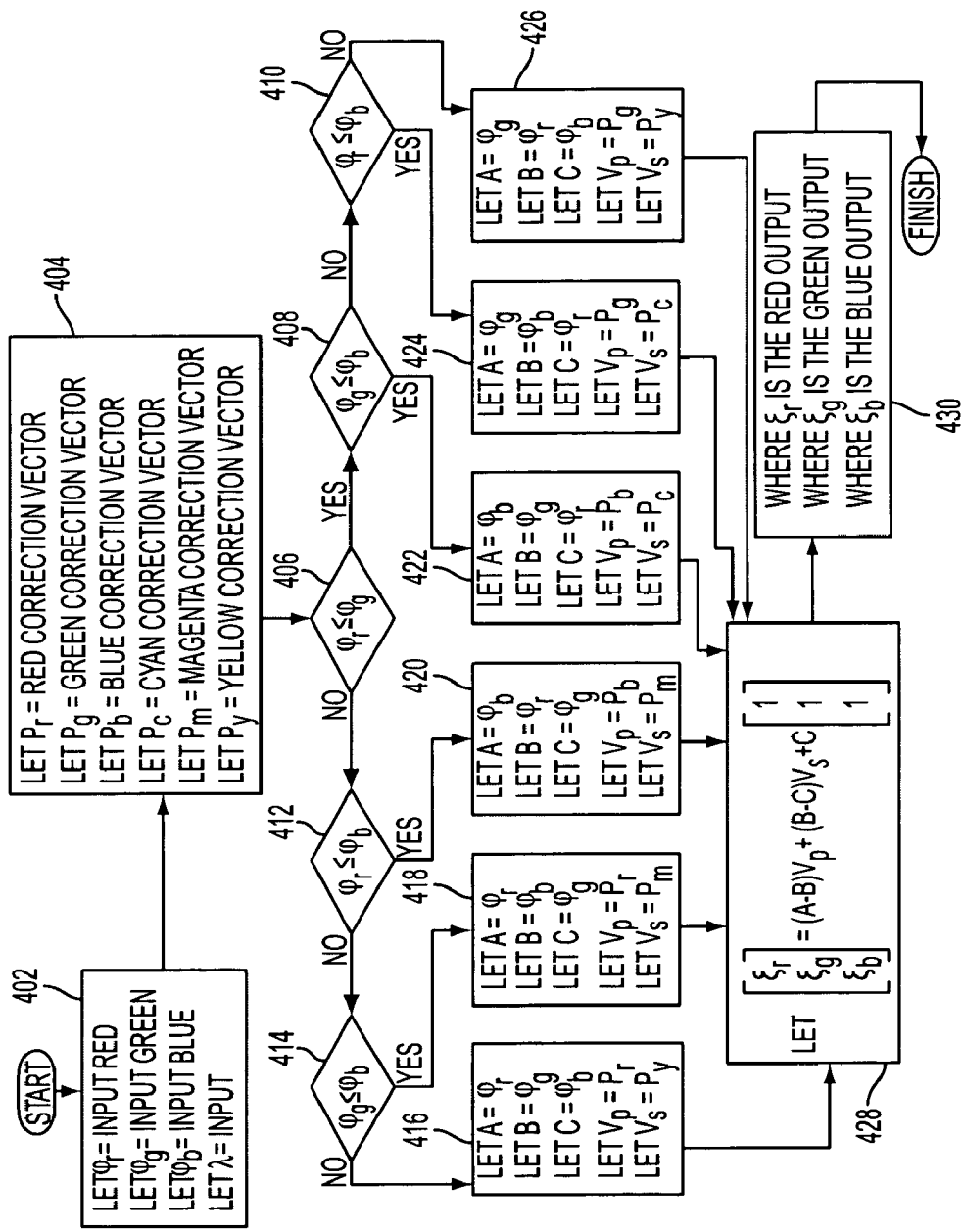
FIG. 4 is an exemplary flow diagram of a process of primary and secondary hue adjustment.

The TRC L is applied to each of the RGB channels. Once the TRC has been applied, the second phase of the color correction is applied in step 116, in which a hue adjustment of the primaries and secondaries is performed. Referring to FIG. 4, a process 400 of primary and secondary hue adjustment is shown. Process 400 begins with step 402, in which the input red, green, and blue values, $\phi_r$, $\phi_g$, and $\phi_b$, respectively, are loaded from the driver files based on user selections, along with a $\lambda$ supplied by the selected simulated color corrections. In step 404, six color correction vectors: $P_r$, $P_g$, $P_b$, $P_c$, $P_m$, and $P_y$ are loaded from the driver files based on user selections. For example, if the user has an sRGB monitor, for which an uncorrected mimic on the screen should match a page printed in the sRGB-Display Mode, then the color correction vectors for this mode may be generated using an identity transform having the following parameters:

$$\text{Let } \lambda = 0,$$

$$P_r = \begin{bmatrix} 1 \\ 0 \\ 0 \end{bmatrix}, P_g = \begin{bmatrix} 0 \\ 1 \\ 0 \end{bmatrix}, P_b = \begin{bmatrix} 0 \\ 0 \\ 1 \end{bmatrix}, P_c = \begin{bmatrix} 0 \\ 1 \\ 1 \end{bmatrix}, P_m = \begin{bmatrix} 1 \\ 0 \\ 1 \end{bmatrix}, P_y = \begin{bmatrix} 1 \\ 1 \\ 0 \end{bmatrix}$$

All of the other color corrections will be slight variations of the identity transform. In step 406-414, the input color values are compared with each other, and based on these comparisons, in steps 416-426, values are assigned to intermediate variables that are used to perform the final color correction processing. In step 428, the final color correction processing is performed, and, in step 430, the corrected color values $\xi_r$ (red), $\xi_g$ (green), and $\xi_b$ (blue) are output.

Returning to FIG. 1, in step 106 of process 100, shown in FIG. 1, color slider adjustments are performed. In the example shown in FIG. 1, there are six color slider adjustments, each represented by a color slider parameter: lightness $\sigma_l$, saturation $\sigma_s$, contrast $\sigma_x$, cyan-cast $\sigma_c$, magenta-cast $\sigma_m$, and yellow-cast $\sigma_y$. In this example, each color slider parameter value is valid in the range of $-1 \leq \sigma \leq 1$, and all of the color slider computations are performed in CMY device space.

In step 118 of FIG. 1, the input RGB values are first converted into CMY as follows:

$$\text{let } \xi_c = 1-\xi_r, \text{ where } 0 \leq \xi_r \leq 1,$$

$$\text{let } \xi_m = 1-\xi_g, \text{ where } 0 \leq \xi_g \leq 1, \text{ and}$$

$$\text{let } \xi_y = 1-\xi_b, \text{ where } 0 \leq \xi_b \leq 1.$$

The CMY signal is then split into a gray component g, and a chroma vector $\bar{\kappa}$ as follows:

$$\text{let } g = \frac{(\xi_c + \xi_m + \xi_y)}{3},$$

this is the average of the CMY signal, and let $$\bar{\kappa} = \begin{bmatrix} \xi_c \\ \xi_m \\ \xi_y \end{bmatrix} - \begin{bmatrix} g \\ g \\ g \end{bmatrix}, \bar{\kappa}$$

is orthogonal to the vector $$\begin{bmatrix} g \\ g \\ g \end{bmatrix}.$$

In step 120 of FIG. 1, the gray component g is adjusted using a TRC named G (this is the lightness adjustment). It uses the lightness parameter $\sigma_l$ as follows:

$$\text{let } G(g)=(1-\sigma_l)g+\sigma_l^2 g^2.$$

In step 122 of FIG. 1, the gray component g is further adjusted using TRC named X (this is the contrast adjustment). It uses the contrast parameter $\sigma_X$ as follows: let $$X(g) =$$

$$\begin{cases} \text{if } (\sigma_X \leq 0), & \text{then } X(g) = -4\sigma_X g^3 + 6\sigma_X g^2 + (1-2\sigma_X)g \\ \text{if } (\sigma_X > 0) \text{ and} \left(g \leq \frac{1}{2}\right), & \text{then } X(g) = 4\sigma_X g^3 + (1-\sigma_X)g \\ \text{if } (\sigma_X > 0) \text{ and} \left(g > \frac{1}{2}\right), & \text{then } X(g) = \frac{4\sigma_X g^3 - 12\sigma_X g^2 +}{(1+11\sigma_X)g - 3\sigma_X} \end{cases}$$

The gray component of the image is adjusted before the saturation is adjusted. The lightness is adjustment is applied first, then the contrast adjustment is applied as follows:

$$\text{let } g=X(G(g)).$$

Figure 5:
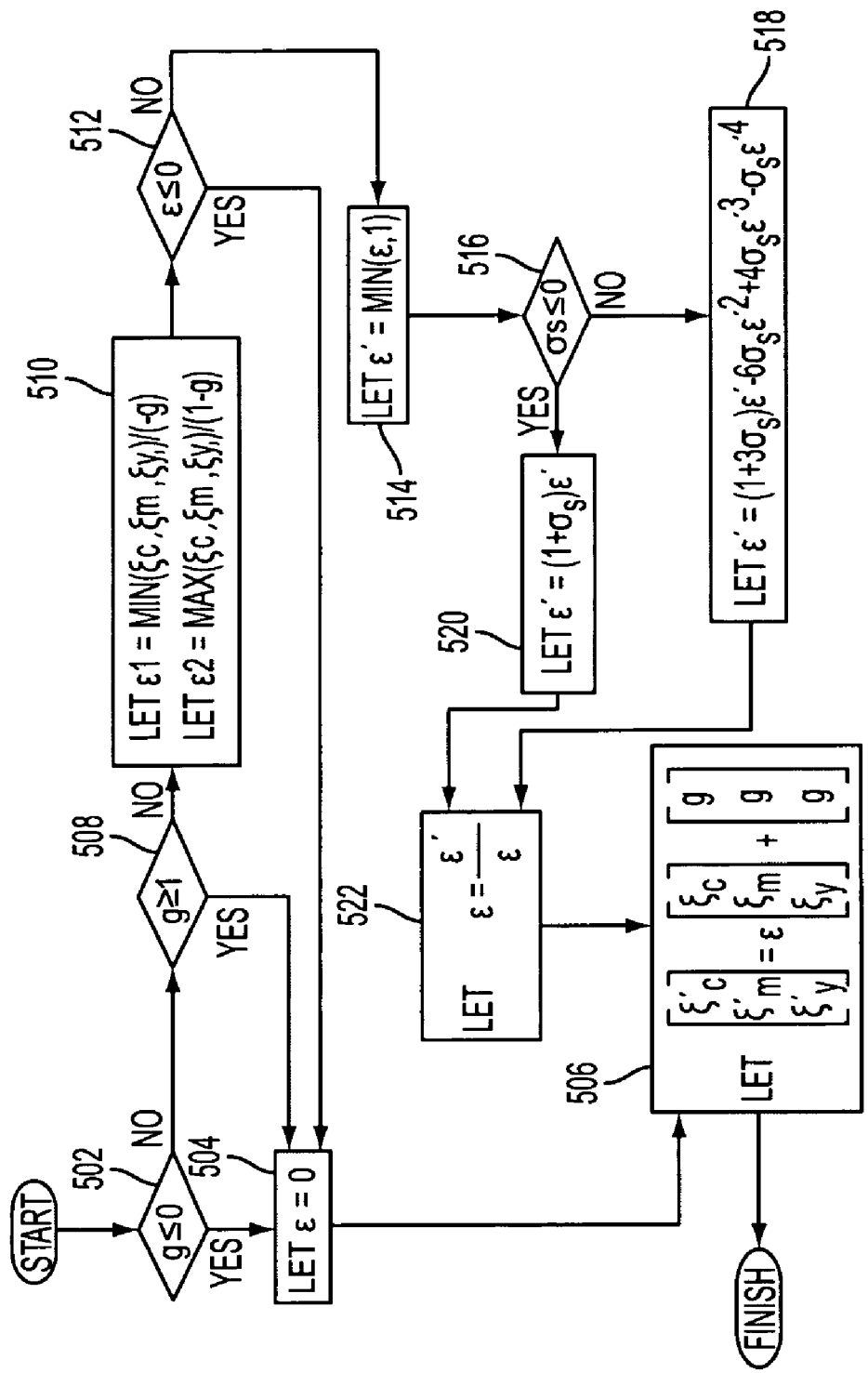
FIG. 5 is an exemplary illustration of a saturation adjustment process.

In step 124 of FIG. 1, the saturation adjustment is performed. Referring to FIG. 5, an exemplary saturation adjustment process 500 is illustrated. The saturation is adjusted algorithmically with the parameter $\sigma_s$. Process 500 begins with step 502, in which it is determined whether the gray component g is less than or equal to zero. If so, the process continues with step 504, in which $\epsilon$ is set to 0, then with step 506, in which the CMY components are adjusted using the gray component.

If, in step 502, it is determined that the gray component g is not less than or equal to zero, then the process continues with step 508, in which it is determined whether the gray component g is greater than or equal to one. If so, the process continues with steps 504 and 506. If not, then the process continues with step 510, in which intermediate values are defined, then with steps 512-522, in which the intermediate values are processed, and then step 506.

Returning to FIG. 1, in steps 126, 128, and 130, the three hue cast parameters; $\sigma_c$, $\sigma_m$, $\sigma_y$; are applied as follows:

$$\text{let } \xi_c''' = (1 + \sigma_c)\xi_c'' - \sigma_c(\xi_c'')^2,$$

$$\text{let } \xi_m''' = (1 + \sigma_m)\xi_m'' - \sigma_m(\xi_m'')^2, \text{ and}$$

$$\text{let } \xi_y''' = (1 + \sigma_y)\xi_y'' - \sigma_y(\xi_y'')^2.$$

Finally, in step 132 of FIG. 1, CMY values are converted back into RGB values as follows:

$$\text{let } \xi_r' = 1 - \xi_c''',$$

$$\text{let } \xi_g' = 1 - \xi_m''', \text{ and}$$

$$\text{let } \xi_b' = 1 - \xi_y'''.$$

Figure 6:
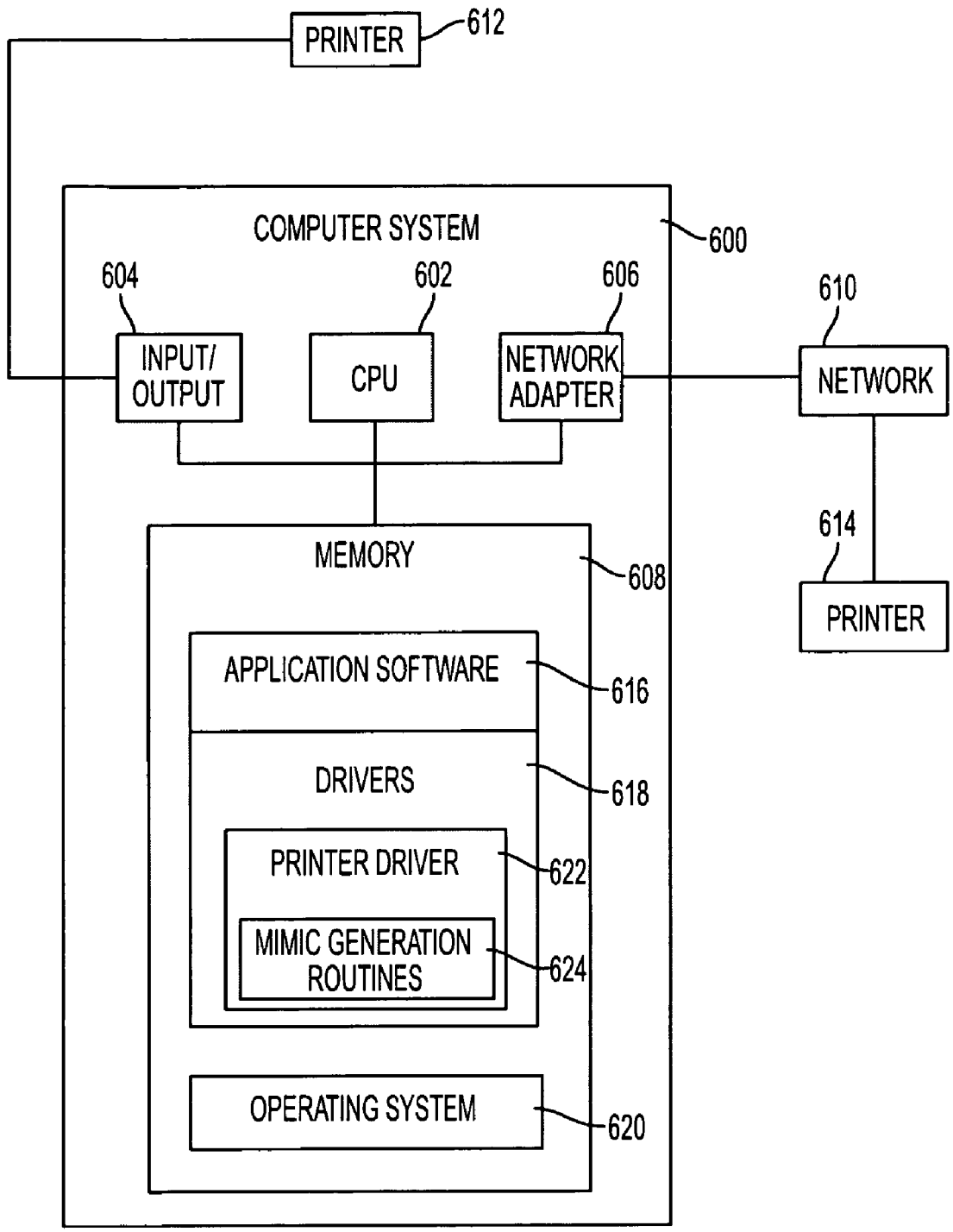
FIG. 6 is an exemplary block diagram of a computer system, in which the present technology may be implemented.

An exemplary block diagram of a typical computer system 600, in which the present technology may be implemented, is shown in FIG. 6. Computer system 600 is typically a programmed general-purpose computer system, such as a personal computer, workstation, server system, and minicomputer or mainframe computer. Computer system 600 includes processor (CPU) 602, input/output circuitry 604, network adapter 606, and memory 608. CPU 602 executes program instructions in order to carry out the functions of the present disclosure. Typically, CPU 602 is a microprocessor, such as an INTEL PENTIUM® processor, but may also be a minicomputer or mainframe computer processor. Input/output circuitry 604 provides the capability to input data to, or output data from, computer system 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces computer system 600 with network 610. Network 610 may be any standard local area network (LAN) or wide area network (WAN), such as Ethernet, Token Ring, the Internet, or a private or proprietary LAN/WAN. In the example shown in FIG. 6, printers for which mimics may be generated may be connected using input/output circuitry 604 and/or network adapter 606 and network 610. For example, printer 612 may be connected using input/output circuitry 604, while printer 614 may be connected using network adapter 606 and network 610. It is to be noted that the present technology is applicable to these and any other form of printer connection.

Memory 608 stores program instructions that are executed by, and data that are used and processed by, CPU 602 to perform the functions of the present technology. Memory 608 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 608 includes application software 616, drivers 618, and operating system 620. Application software 616 includes software programs that may be used to create and modify information, such as information that may be printed. Drivers 618 include software programs that enable other programs, typically, an operating system 620 to interact with a hardware device. Included in drivers 618 is printer driver 622, which enables interaction with one or more printers, such as printer 612 and/or printer 614. Printer driver 622 includes a number of software routines, including mimic generation routines 624, which implement a process such as that shown in FIG. 1. Operating system 620 provides overall system functionality.

Although specific embodiments of the present technology have been described, it will be understood by those of skill in the art that there are other embodiments that are equivalent to the described embodiments. Accordingly, it is to be understood that the technology is not to be limited by the specific illustrated embodiments, but only by the scope of the appended claims.

The invention claimed is:

1. A method for generating a mimic visual representation of an image, comprising:
   providing a plurality of predefined visual representations;
   receiving a plurality of values of a plurality of parameters of the image on a user interface;
   generating the mimic visual representation by interpolating among the predefined visual representations based on the values of the parameters; and
   displaying the mimic visual representation;
   wherein the plurality of parameters comprises at least one of: a parameter representing a size of a gamut of a colorspace, a parameter representing a halftone graininess of an image, a parameter representing a quality of a photographic image, a parameter representing a quality of graphics of an image, a parameter representing an amount of color correction of an image, a parameter representing an amount of lightness correction of an image, a parameter representing an amount of hue correction of an image, a parameter representing an amount of lightness adjustment of an image, a parameter representing an amount of contrast adjustment of an image, a parameter representing an amount of saturation adjustment of an image, a parameter representing an amount of cyan cast adjustment of an image, a parameter representing an amount of magenta cast adjustment of an image, and a parameter representing an amount of yellow cast adjustment of an image.

2. The method of claim 1, wherein the plurality of predefined visual representations comprises, for at least a subset of the plurality of parameters, a predefined visual representation corresponding to all of the subset of the parameters having their maximum values, and, for each of the parameters in the subset of parameters, a predefined visual representation corresponding to the parameter having its maximum value and the other parameters of the subset of parameters having their minimum values.

3. The method of claim 1, wherein the interpolating is performed by:
   performing N-body interpolation among the predefined visual representations, wherein N is equal to the number of predefined visual representations.

4. The method of claim 1, farther comprising:
modifying the generated mimic visual representation based on at least one additional parameter, to represent the effect of the at least one additional parameter.

5. The method of claim 1, wherein the generated mimic visual representation is modified algorithmically based on at least one additional parameter.

6. The method of claim 1, wherein the method is performed for a photocopier, a xerographic photocopier, a scanner, a printer, a xerographic printer, a fax machine, a xerographic fax machine, a multi-function device, or a xerographic multi-function device.

7. A system for generating a mimic visual representation of an image, comprising:
a processor operable to execute computer program instructions;
a memory operable to store computer program instructions executable by the processor; and
computer program instructions stored in the memory and executable to perform the steps of:
providing a plurality of predefined visual representations;
receiving a plurality of values of a plurality of parameters of the image on a user interface;
generating the mimic visual representation by interpolating among the predefined visual representations based on the values of the parameters; and
displaying the mimic visual representation
wherein the plurality of parameters comprises at least one of: a parameter representing a size of a gamut of a colorspace, a parameter representing a halftone graininess of an image, a parameter representing a quality of a photographic image, a parameter representing a quality of graphics of an image, a parameter representing an amount of color correction of an image, a parameter representing an amount of lightness correction of an image, a parameter representing an amount of hue correction of an image, a parameter representing an amount of lightness adjustment of an image, a parameter representing an amount of contrast adjustment of an image, a parameter representing an amount of saturation adjustment of an image, a parameter representing an amount of cyan cast adjustment of an image, a parameter representing an amount of magenta cast adjustment of an image, and a parameter representing an amount of yellow cast adjustment of an image.

8. The system of claim 7, wherein the plurality of predefined visual representations comprises, for at least a subset of the plurality of parameters, a predefined visual representation corresponding to all of the subset of the parameters having their maximum values, and, for each of the parameters in the subset of parameters, a predefined visual representation corresponding to the parameter having its maximum value and the other parameters of the subset of parameters having their minimum values.

9. The system of claim 7, wherein the interpolating is performed by:
performing N-body interpolation among the predefined visual representations, wherein N is equal to the number of predefined visual representations.

10. The system of claim 7, further comprising:
modifying the generated mimic visual representation based on at least one additional parameter, to represent the effect of the at least one additional parameter.

11. The system of claim 7, wherein the generated mimic visual representation is modified algorithmically based on at least one additional parameter.

12. The system of claim 7, wherein the device is photocopier, a xerographic photocopier, a scanner, a printer, a xerographic printer, a fax machine, a xerographic fax machine, a multi-function device, or a xerographic multi-function device.

13. A computer program product for configuring a device comprising:
a computer readable medium;
computer program instructions, recorded on the computer readable medium, executable by a processor, for generating a mimic visual representation of an image by performing the steps of:
providing a plurality of predefined visual representations;
receiving a plurality of values of a plurality of parameters of the image on a user interface;
generating the mimic visual representation by interpolating among the predefined visual representations based on the values of the parameters; and
causing the mimic visual representation to be displayed;
wherein the plurality of parameters comprises at least one of: a parameter representing a size of a gamut of a colorspace, a parameter representing a halftone graininess of an image, a parameter representing a quality of a photographic image, a parameter representing a quality of graphics of an image, a parameter representing an amount of color correction of an image, a parameter representing an amount of lightness correction of an image, a parameter representing an amount of hue correction of an image, a parameter representing an amount of lightness adjustment of an image, a parameter representing an amount of contrast adjustment of an image, a parameter representing an amount of saturation adjustment of an image, a parameter representing an amount of cyan cast adjustment of an image, a parameter representing an amount of magenta cast adjustment of an image, and a parameter representing an amount of yellow cast adjustment of an image.

14. The computer program product of claim 13, wherein the plurality of predefined visual representations comprises, for at least a subset of the plurality of parameters, a predefined visual representation corresponding to all of the subset of the parameters having their maximum values, and, for each of the parameters in the subset of parameters, a predefined visual representation corresponding to the parameter having its maximum value and the other parameters of the subset of parameters having their minimum values.

15. The computer program product of claim 13, wherein the interpolating is performed by:
performing N-body interpolation among the predefined visual representations, wherein N is equal to the number of predefined visual representations.

16. The computer program product of claim 13, further comprising:
modifying the generated mimic visual representation algorithmically based on at least one additional parameter, to represent the effect of the at least one additional parameter.

17. The computer program product of claim 13, wherein computer program instructions are executable by a processor in a photocopier, a xerographic photocopier, a scanner, a printer, a xerographic printer, a fax machine, a xerographic fax machine, a multi-function device, or a xerographic multi-function device.

* * * * *